United States Patent [19]

Wolf et al.

[11] Patent Number: 4,504,244
[45] Date of Patent: Mar. 12, 1985

[54] ROTATIONALLY ELASTIC COUPLING

[75] Inventors: Franz-Josef Wolf; Hubert Pletsch; Gregoire Benneyan, all of Bad Soden-Salmünster, Fed. Rep. of Germany

[73] Assignee: WOCO Franz-Josef Wolf & Co., Bad Soden-Salmünster, Fed. Rep. of Germany

[21] Appl. No.: 455,694

[22] Filed: Jan. 5, 1983

[30] Foreign Application Priority Data

Nov. 25, 1982 [DE] Fed. Rep. of Germany ....... 3243640

[51] Int. Cl.$^3$ .......................... F16D 3/68; F16D 3/50
[52] U.S. Cl. ........................................ 464/83; 464/85; 464/89; 464/90
[58] Field of Search ................... 464/74, 81–85, 464/87, 89, 90, 92, 93

[56] References Cited

U.S. PATENT DOCUMENTS

| 3,386,264 | 6/1968 | Paulsen | 464/74 |
| 4,249,396 | 2/1981 | Ziegler | 464/83 |
| 4,262,499 | 4/1981 | Pfeifer | 464/82 |
| 4,277,958 | 7/1981 | Hackforth et al. | 464/83 X |
| 4,337,629 | 7/1982 | Walter | 464/82 X |
| 4,347,716 | 9/1982 | Hackforth et al. | 464/83 |
| 4,380,442 | 4/1983 | Amsel | 464/87 X |
| 4,424,046 | 1/1984 | Ziegler | 464/83 X |

Primary Examiner—John Petrakes
Attorney, Agent, or Firm—Jordan and Hamburg

[57] ABSTRACT

A rotationally elastic coupling with two half-couplings can be twisted relative to one another, these half-couplings being connected with one another so as to transmit forces by means of a sprung intermediate link and by means of a movement-converting intermediate link which converts a rotation into a translational movement or, vice versa, a translational movement into a rotation. At least one sheet metal support is provided which is in contact at a radially outward position with one of the sprung intermediate links which in turn is supported rotationally solidly and frictionally at a radially inward position with one of the two half-couplings. The sheet metal support is subjected to forces directly or by means of a coupling element of the movement converting intermediate link, in particular an eccentric or a crank, this movement converting intermediate link being rotationally and rotationally solidly connected to the other half-coupling. Using such a coupling, practically linear and soft spring characteristics can be produced for high torques over twist angle ranges of far beyond 30°.

24 Claims, 7 Drawing Figures

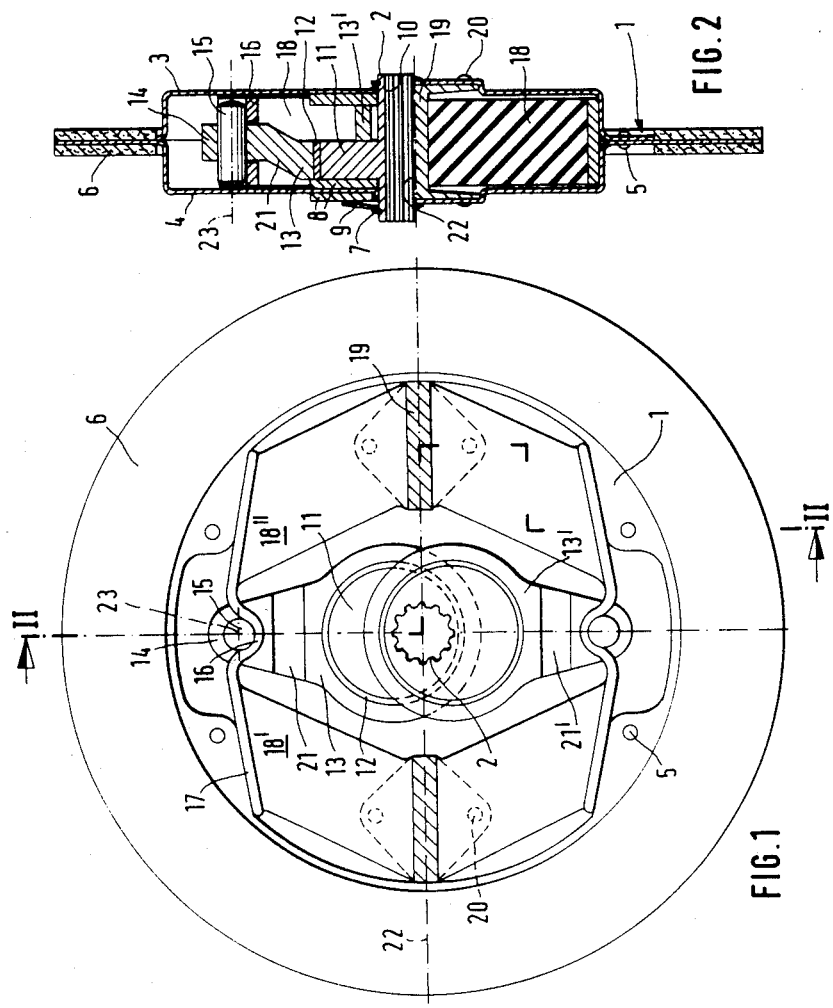

ROTATIONALLY ELASTIC COUPLING

BACKGROUND OF THE INVENTION

The invention concerns a rotationally elastic coupling, in which two mutually rotatable half-couplings are connected with one another so as to transmit force by means of at least one sprung intermediate link and, in series with this sprung intermediate link in terms of the force transmission path through the coupling, by means of at least one movement-converting intermediate link converting a rotation into a translational movement or, vice versa, a translational movement into a rotation.

A coupling of this type is the subject of the not previously published European Patent Application 82,109,563.5. The sprung intermediate links of this coupling are special rubber springs with and without vulcanised-in intermediate sheet metal parts for preventing lateral expansion and the movement-converting intermediate link is an eccentric which is directly in contact with the sprung intermediate links via an eccentric bearing and deforms the intermediate links when positively loaded in elastic compression in a radially outwards direction.

Particularly in the case where the sprung intermediate links are embodied in the form of rubber springs, this coupling presents an often undesirable increasing progression of the spring characteristic in the high rotational speed range because of the centrifugal forces arising. The stiffening of the spring characteristic of a rubber spring, which occurs in any case, with increasing compressive load, is thus amplified in the same direction by the centrifugal force. This undesirable and prematurely occurring increased stiffness of the spring characteristic with increasing speed becomes quite noticeable, for example, when used in a coupling for a vehicle drive at rotational speeds above about 3,000 rpm.

SUMMARY OF THE INVENTION

The invention is based on the object of improving a coupling of the type described above with possible twist angles of far beyond 30° in such a way that the coupling retains a soft characteristic up to relatively large twist angles even at high and very high rotational speeds without a progression occurring which is increasingly displaced to smaller twist angles.

The invention achieves this object for a rotationally elastic coupling of the type described at the beginning by at least one sheet metal support which is in contact at a radially outward position with at least one sprung intermediate link which is connected in frictional support at a radially inward position to a first of the two half-couplings and to which the movement-converting intermediate link is linked in a translatory fashion directly or over at least one coupling link in such a way that the sheet metal support in the event of a relative rotation, relative to the first half-coupling, of the other half-coupling which is rotationally solidly connected with the movement-converting intermediate link, is subjected to an at least substantially radial force which strains or relieves the sprung intermediate link.

The sprung intermediate link is here preferably a rubber spring, the movement-converting intermediate link preferably a crank, particularly a crank disc, or an eccentric disc and the preferably provided coupling link is especially a solid connecting rod, by means of which the shear loading on the spring, which can never be completely excluded with movement conversion by a crank or an eccentric, can be virtually completely excluded.

The feature of the coupling important to the invention is thus that the translatory, at least mainly radially occurring loading of the sheet metal support occurs radially inwards and not radially outwards. The sprung intermediate links are thus not subjected to forces in or at least substantially in the direction of the centrifugal forces acting on them when the coupling rotates but are subjected to forces at least substantially opposed to this direction of the centrifugal forces acting when the coupling rotates. Thus, the effect of this is that the centrifugal force occurring during high speed use of the coupling acts against the commencement of spring characteristic progression and that effectively prolongs the soft and substantially linear part of the spring characteristic used as the working range. This of course applies not only to the preferably used rubber springs but also in a similar manner to any given steel springs which can also be used in the rotationally elastic coupling according to the invention instead of the rubber springs.

The movement-converting intermediate link, which can in principle be of any given type, for example an opening mechanism or a spiral mechanism or a screw cam surface, and is preferably a crank, particularly a crank disc, or an eccentric disc, can be linked directly, for example by means of a shaped support eye, or indirectly by means of a coupling link so as to transmit force to the sheet metal support. The linkage preferably occurs via a coupling link in order to completely exclude the small shear components associated with direct crank drives and eccentric drives. In principle, any given coupling links known per se can be used, depending on the task which the coupling is to fulfil, as coupling links for the coupling, that is the force-transmitting connection between the translatory output of the movement-converting intermediate link and the sheet metal support. The coupling link can be totally stable in shape and solid, that is like a connecting rod or a coupling rocker, for example, it can be flexibly bendable and only solid in the tensile direction, i.e. strong in tension, such as, for example, a tight cable connection or a tight chain connection, consisting in particular of steel, or it can be elastic in tension with elastic extensibility preferably limited by a positive stop. The bendable or unwinding tensile links with preferably limited elasticity in tension usable as coupling links within the scope of the invention can, for example, be in the form of a rubber strap with a not fully extended chain vulcanised-in or with a not fully extended cable vulcanised-in or of a coupling link consisting of elastomer which is not reinforced in this direction; in the last case mentioned, the sprung path is limited by stops which are formed at complementary points on the parts between which the in itself unlimited elastic coupling link is connected. The last named type of tensile elastic coupling is preferably used here in series with a solid coupling link, in particular a connecting rod. An example of such a series connection is, according to one embodiment of the invention, a solid connecting rod whose foot or lower eye relative to the rotational axis is linked solidly to the movement-converting intermediate link and whose head is linked to an elastic support with translatory displaceable rotational axis on the sheet metal support. In this case, the outwards elastic deflectibility of the bearing axis can be limited by positive stops, for example between the bearing shell and the head of the connecting rod or the bearing shell and a gudgeon pin. In this case, such an arrangement provides in an obvious fashion the pre-damping typical for conventional coupling discs in the angular range of up to 2° or 3°, for example, referred to the twist angle 0°, i.e. referred to the zero position of the two half-couplings relative to one another.

Whereas as soft as possible and as linear as possible a spring characteristic up to the largest possible twist angle is required and desired for most applications, it is at least not necessary and usually not even desirable for most of these fields of application that a soft characteristic of this type should begin right from the zero position or in direct connection to the pre-damping as soon as the smallest amounts of work are introduced into the coupling. Particularly in the case of motor vehicle construction, a rotationally elastic coupling, corresponding to the specifications of the designers, shows a markedly steep spring characteristic, if possible after the pre-damping and initially reaching into the relevant useful load range, and is then characterised by as flat and as soft as possible and as linear as possible a spring characteristic in the actual working range, with the progression only appearing with increasing workloading on the coupling and increasing rotational speed at the largest possible twist angles. This pre-progression, that is the strongly progressive shape of the spring characteristic between the zero position or pre-damping and the actual use and working range of the coupling, can be produced in a simple manner in the coupling according to the invention using a further embodiment wherein the sprung intermediate links, that is to say the steel springs or the rubber springs, the hydraulic or pneumatic springs, between the sheet metal support and the contact point on one of the two half-couplings are pre-stressed in compression.

A further advantage obtainable with the coupling in accordance with the invention by means of the inclusion of the sheet metal support and the at least substantially radially inwards operating spring compression lies in the fact that for a prescribed diameter of the coupling in the direction of loading of the sprung intermediate links, substantially greater constructional heights of the sprung intermediate links can be incorporated in the design than is possible with an at least substantially radially outwards directed operation of the movement-converting intermediate link. Such increased constructional height can however be used to again extend in the desired manner the soft linear characteristic, i.e. the optimum usable shape of the spring characteristic of the rotationally elastic coupling.

When work is introduced into one half-coupling, for example into the half-coupling on which the sprung intermediate link is held and supported rotationally solidly and frictionally, the force transmission path runs from the input shaft of the coupling into the first half-coupling, from there via the contact support into the sprung intermediate link, from there onto the sheet metal support, from the latter into the coupling link, in some cases several coupling links connected in series, from there in a translatory fashion into the movement-converting intermediate link and from the latter in a rotational fashion via the rotationally solidly connected second half-coupling into the output shaft of the coupling. In this process, the work introduced at the input shaft is stored by the sprung intermediate link until a torque balance is produced, that is until the work introduced is equal in amount to the sum of the stored spring deformation work in the sprung intermediate link of the coupling and the load torque at the output shaft of the coupling.

Described above is the force transmission path through the coupling of the invention from one half-coupling to the other via a sprung intermediate link, a sheet metal support, a coupling link and a movement-converting intermediate link. Such a design of the coupling of the invention is certainly capable of functioning for the transmission of small amounts of work or as a cheap coupling. In order to transmit larger powers and with higher requirements on the endurance and reliability of such couplings, for example in motor vehicle construction, several of these force transmission paths are, however, preferably arranged in parallel to one another. This means that the total work to be transmitted from the input half to the output half of the coupling is divided into two, three, four or more mutually parallel force transmission paths which are then reunited at the output half of the coupling. The division occurs preferably into, in particular, two, three, four or five such parallel force transmission paths. In the embodiment of the coupling with two parallel force transmission paths, the sprung intermediate links are preferably supported spring base against spring base so that the counter-support itself can be relatively weakly dimensioned. With more than two parallel force transmission paths, the base regions of the sprung intermediate links are preferably supported at their edges in each case to form a closed line of action with a mutually symmetrical distribution, thus, for example at the corners of an equilateral triangle in the case of three parallel force transmission paths, at the corners of a square in the case of four parallel force transmission paths and at the corners of an equal sided regular pentagon in the case of five parallel force transmission paths.

The invention is described below in more detail using illustrative examples together with the drawings.

BRIEF DESCRIPTION OF THE DRAWINGS

FIG. 1 is an axial plan view, with a partial radial section, of a rotationally elastic coupling according to one embodiment of the invention;

FIG. 2 is a sectional view through II-II in FIG. 1;

DESCRIPTION OF THE PREFERRED EMBODIMENTS

Figure 3C:
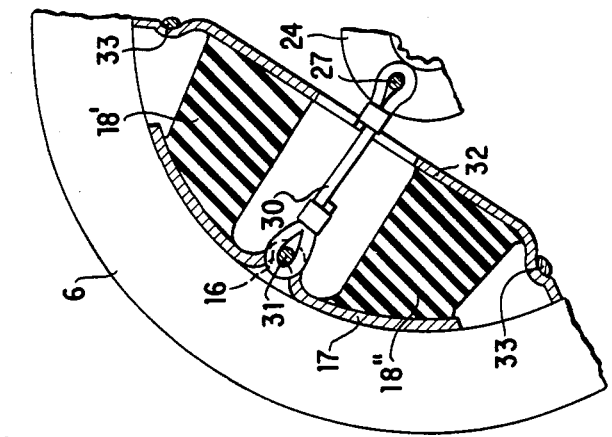
FIGS. 3A, 3B and 3C are partial sectional views of three different embodiments of the rotationally elastic coupling, each in a representation corresponding to FIG. 1.

As the first illustrative example of the invention, FIG. 1 shows an axial side view of a rotationally elastic coupling in the form of a rotationally elastic coupling disc for a diaphragm spring clutch between the engine and gearbox of a motor vehicle.

FIG. 2 is a sectional view taken along the cutting plane II-II in FIG. 1.

The rotationally elastic separating clutch disc of FIGS. 1 and 2, referred to as the "clutch" for shortness in what follows, consists of a first half-coupling 1 and a second half-coupling 2, which are mutually connected rotationally elastically and which transmit force by means of intermediate links. The two half-couplings 1,2 are arranged to be mutually coaxial and also at least substantially co-planar and in such a way that the second half-coupling on the inside is enclosed by the first half-coupling on the outside.

The first or outer half-coupling 1 consists of a centering and covering plate 3 placed on one side and another centering and covering lining carrier plate 4 on the axially opposite side, the two being mutually solidly connected around the periphery by rivets 5 or by screws, welding or in other ways. The lining carrier plate 4 has frictional lining discs 6 at its outer edge in the conventional manner. In contrast to conventional separating clutch discs of this type, there are no lining springs necessary between the lining carrier plate 4 and the frictional lining discs 6 because of the high rotational elasticity of the coupling in accordance with the invention.

The centering plate 3 and the lining carrier plate 4 are both rotatable fixed axially on the inner half-coupling 2 formed as the hub of the clutch. This fixing is effected on each side by a circlip 7, which engages in an annular groove formed in the hub 2. In the manner shown on the left-hand side of FIG. 2, this fixing can be additionally effected by providing a floating washer 8 and, if need be, a rubbing disc 9. The centering plate 3 can, of course, also be fixed in the same manner.

The second half-coupling is formed as the hub 2 of the clutch and provided in the conventional manner with internal splines 10 through which it can be rotationally solidly fixed to a clutch output shaft not shown in the figures, i.e. the driving shaft of the subsequent gearbox in this case.

In the illustrative example of the clutch described, the rotationally elastic connection of the two half-couplings 1,2 with one another is effected by means of two mutually parallel force transmission paths, which are arranged to be mutually symmetrical. For reasons of comprehensible presentation, only one of the two force transmission paths is described in detail, therefore, in what follows.

An eccentric disc 11 is connected rotationally solidly with the second half-coupling, integrally in this case, and the lower connecting rod eye of a connecting rod 13 is carried on this eccentric disc by means of a bearing 12. The connecting rod head 14 is linked via a gudgeon pin 15 in the centre of a seating 16 of a sheet metal support 17. The sheet metal support is vulcanised onto two mutually symmetrical rubber spring packs 18′, 18″, which in common as a rubber spring 18 form the sprung intermediate link of the rotationally elastic coupling. The rubber spring 18 is supported on a protrusion 19, which is solidly connected with the centering plate 3 and the lining carrier plate 4 by means of rivets 20 or in another manner, for example by screwing or welding, i.e. it is solidly connected with the first half-coupling 1. The rubber spring 18 is prestressed in compression between the sheet metal support 17 and the protrusion 19.

The force transmission path through the upper part of the clutch, referred to the representations of FIGS. 1 and 2, is described above. The force transmission path running parallel through the lower part of the clutch is symmetrically completely the same to the force transmission path through the upper part of the clutch described above. An offset 21 in the connecting rod 13 and a corresponding offset 21′ in the lower connecting rod 13′ is provided here for mass balancing in the clutch, which is also intended for higher rotational speeds.

In the case of a relative twist of the first half-coupling 1 relative to the second half-coupling 2, the eccentric 11 is rotated out of the zero position shown in FIGS. 1 and 2—to the right or to the left depending on the direction of rotation of the second half-coupling 2. In both cases, this leads to a reduction of the radial distance between the centre line 22 of the second half-coupling and the centre line 23 of the gudgeon pin 15. In consequence, the sheet metal support 17 in the representations of FIGS. 1 and 2 is forced downwards against the reaction force of the prestressed rubber spring 18, which is further compressed while storing the work fed in. In this process, the deformation work fed into the rubber spring is stored by the rubber spring until the effective torques in the two half-couplings are in equilibrium. In other words, until dynamic torque equilibrium appears between the input half and output half of the coupling, the inertia torque appearing at the output half of the coupling is stored as elastic deformation work of the rubber spring 18 by conversion of the work fed into the input half of the coupling. In this connection, it can be seen that it does not matter whether the outer half-coupling 1 or the inner half-coupling 2 is the input half or the output half of the coupling. The function of the coupling is identical in both cases. The important point is only the twist angle of the two half-couplings 1,2 relative to one another.

Because of the relatively large constructional height of the rubber spring 18, which is almost equal to the radius of the coupling, relatively large torques can be elastically transmitted with the coupling shown in FIGS. 1 and 2 for relatively small coupling diameter.

A further effect, which appears with particular emphasis in the coupling shown in FIGS. 1 and 2, is that the rubber spring 18, the sheet metal support 17 and also the gudgeon pin 15 and the connecting rod 13 are themselves subjected to significant radially outward forces due to the centrifugal forces arising at high rotational speeds. This produces a tendency to unstress the rubber spring 18, i.e. it acts against a progression of the spring characterisitc of the rotationally elastic coupling to a substantial extent.

Figure 3B:
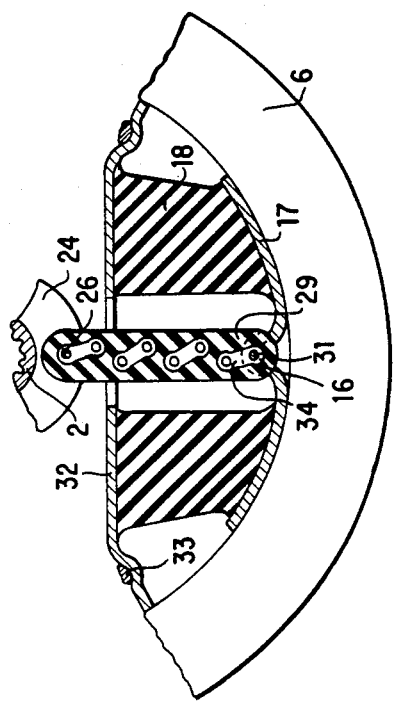
Figure 3A:
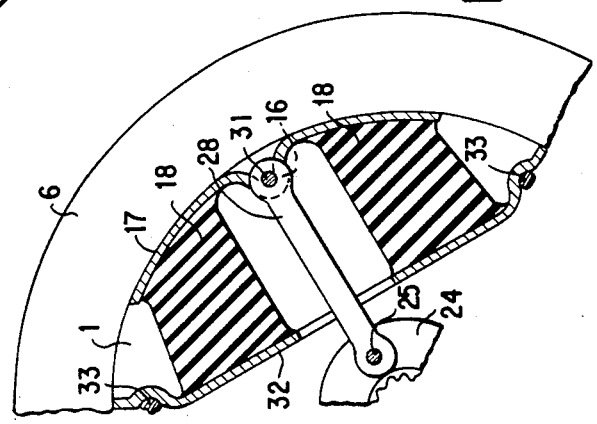

In order to illustrate further illustrative examples of the rotationally elastic coupling according to the invention, rotationally elastic couplings are shown in FIGS. 3A, 3B and 3C, each in an axial side view corresponding to the view of FIG. 1. These rotationally elastic couplings differ from the coupling shown in FIGS. 1 and 2 principally in the fact that instead of the two parallel force transmission paths shown in FIG. 1, they show three such mutually parallel and symmetrical force transmission paths from the first half-coupling 1 to the second half-coupling 2. In FIGS. 3A, 3B and 3C, the movement-converting intermediate link, which is connected rotationally solidly to the second half-coupling 2, in this case integrally, is a crank disc 24 with crank pin 25 (FIG. 3A), crank pin 26 (FIG. 3B) and crank pin 27 (FIG. 3C) instead of the eccentric disc 11 shown in FIGS. 1 and 2. Instead of the connecting rod 13 of FIGS. 1 and 2, the coupling links shown in FIG. 3A is a coupling rod 28, FIG. 3B a rubber coupling 29 and in FIG. 3C a tension cable 30, each of which are connected to the crank pins 25, 26 and 27 respectively. In this connection, it is obvious that only one of the three coupling links shown in FIGS. 3A, 3B and 3C would be selected in practice and that these identical coupling links would then be connected to all three crank pins. The representation chosen in FIGS. 3A, 3B and 3C are only intended to provide a compressed illustration of the various possible illustrative examples of the invention.

The coupling links 28, 29, 30 shown in FIGS. 3A, 3B and 3C, which are connected by their feet to the crank pins of the crank disc 24, are linked in the same manner in each case with their heads by means of a coupling pin 31 to a seating 16 in the centre of a sheet metal support 17, which is in contact at a radially outward position with a rubber spring 18 and is connected to the latter by vulcanisation. Each of the three rubber springs 18, shown in FIGS. 3A, 3B and 3C and consisting in each case of two symmetrically identical rubber spring packs 18', 18", is supported at a radially inward position on a protrusion 32. Each of the three protrusions 32 is supported at its outer edges on a reaction support pin 33 which is in turn solidly connected to the first half-coupling 1. The three protrusions 32 of the three rubber springs 18 are thus arranged symmetrically relative to one another in star formation in such a way that the edges of two neighbouring protrusions 32 are supported in each case on one common reaction support pin 33 and on one another. Thus the three protrusions 32 enclose an equilateral triangle in radial section.

In FIG. 3A, the coupling link is represented as a solid coupling rod 28. This arrangement is extremely stable and robust and capable of transmitting very large torques. This advantage is associated with the disadvantage that the twist angle between the first half-coupling 1 and the second half-coupling 2 is limited to approximately 90° in both rotational directions because of the rigidity of the coupling rod 28.

In contrast, the twist angle for the coupling link 29 in FIG. 3B and 30 in FIG. 3C, i.e. for the rubber coupling 29 and the steel cable 30, is practically only limited by the length of the coupling links and the compressability of the rubber springs 18 and even in practice can amount to more than 180° in both rotational directions without difficulty.

Whereas the steel cable shown in FIG. 3C is solid in tension, the rubber coupling 29 shown in FIG. 3B is elastic in tension. The effective tensile spring constant of the rubber coupling 29 is, in this connection, smaller than the compressive spring constant of the rubber spring 18. Thus when the crank disc 24 is twisted from its zero position shown in FIGS. 3A, 3B and 3C by a relative twist of the two half-couplings relative to one another, this causes a direct compression of the associated rubber spring 18 in the case of the coupling rod 28 (FIG. 3A) in a similar manner to the tension cable 30 (FIG. 3C). In contrast, such a twist of the crank disc 24 initially causes an extension of the rubber coupling 29 (FIG. 3B) without a significant force being transmitted to the associated rubber spring 18. Because of this effect, the work produced by the crank disc 24 and transmitted to the rubber coupling 29 is not fed into the rubber spring 18 until either the spring forces of the rubber coupling 29 and the rubber spring 18 are equally large or the reinforcement chain 34, vulcanised into the rubber coupling 29 and not extended in the unstressed condition, is stretched out because of the extension of the rubber coupling 29, thus bringing about a solid tensile connection between the crank disc 24 and the rubber spring 18. Such a rubber coupling 29 thus produces the pre-damping which is conventional for separating clutch discs in motor vehicle construction.

Figure 4:
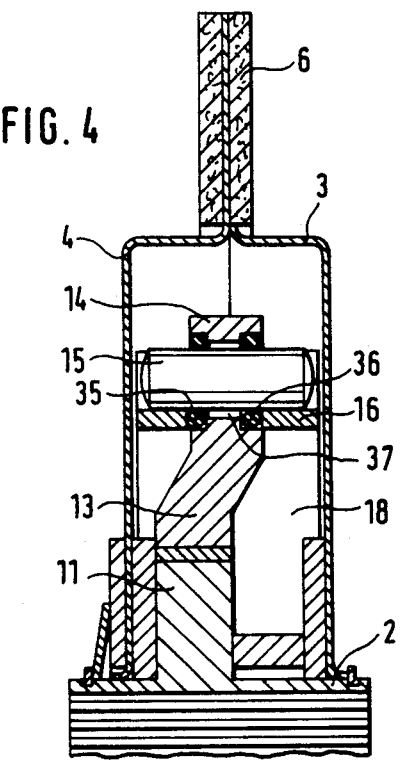
FIG. 4 is a partial sectional view of the rotationally elastic coupling corresponding to the representation in FIG. 2 and modified compared with the illustrative example shown there by pre-damping.

A further possibility of introducing the pre-damping conventional for motor vehicle construction is shown in FIG. 4. The clutch shown in FIG. 4 corresponds substantially to the clutch shown in FIG. 2 and differs from the latter in that the gudgeon pin 15 does not positively connect the connecting rod head 14 with the seating 16 in the effective direction, as shown in FIG. 2, but is supported by means of elastic rubber rings 35,36 in the eye of the connecting rod head 37. The free internal diameter of the connecting rod eye 37 is thus substantially greater than the external diameter of the gudgeon pin 15.

If a downward pull is now applied to the connecting rod 13 in the representation of FIG. 4, this pull will not be immediately introduced as compression work into the rubber spring 18 but will be accepted by the rubber rings 35 and 36 as compression deformation work. This continues until the top of the connecting rod eye 37 comes into immediate positive contact with the top of the gudgeon pin 15 or until the deformation work necessary for further compressive deformation of the rubber rings, 35,36 is equal to or greater than the deformation work necessary for deforming the prestressed rubber spring 18.

Figure 5:
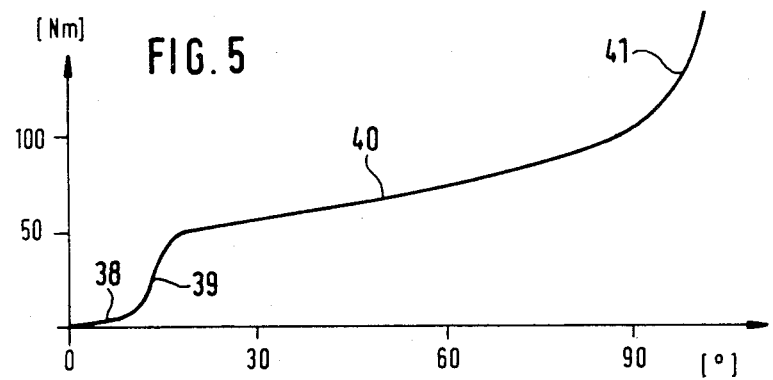
FIG. 5 is a curve showing the spring characteristic of the rotationally elastic coupling shown in FIG. 4.

The spring characteristic obtained with the coupling shown in FIG. 4 is given in FIG. 5. At the beginning of the twist of the two half-couplings 1,2 relative to one another from the zero position, the characteristic first passes through the pre-damping region 38 produced by the rubber rings 35,36. This pre-damping region 38, which features a particularly flat shape of the characteristic, normally extends over a twist angle range of approximately 3° to 5° and is shown somewhat enlarged in FIG. 5 for clearer presentation. With the occurrence of the positive connection between the connecting rod head 14 or the top of the connecting rod eye 37 and the gudgeon pin 15, the work introduced into the rubber spring 18 via the connecting rod 13 is then introduced completely, directly and without loss into this rubber spring 18. Due to the compressive prestress of the rubber spring 18, the spring characteristic then has an initially steep pre-progression region 39. This pre-progression region 39 has the objective of passing through a region of low torques, which is relatively unimportant with respect to torque damping in motor vehicle construction, as rapidly as possible and with the smallest possible twist angle. The shape of the spring characteristic in this pre-progression region 39 is thus determined mainly by the degree of pre-compression or prestressing.

We claim:

1. A rotationally elastic coupling comprising two rotatable half coupling means, an eccentric means mounted on one of said half coupling means, said eccentric means being displaced along a translatory path of travel upon rotation of said one half coupling means, resilient means mounted on said other half coupling means, said resilient means being disposed within said translatory path of travel of said eccentric means such that said resilient means is compressed generally radially inwardly in resiliently resisting relative rotation between said two half coupling means, whereby said two rotatable half coupling means are thereby resiliently coupled.

2. A rotationally elastic coupling according to claim 1, wherein said eccentric means comprises a rigid support means disposed radially outwardly of said resilient means.

3. A rotationally elastic coupling according to claim 2, wherein said eccentric means further comprises an eccentric element and a connecting means between said eccentric element and said support means.

4. A rotationally elastic coupling according to claim 3, wherein said connecting means comprises a second resilient means resiliently connecting said eccentric element to said support means.

5. A rotationally elastic coupling according to claim 4, wherein said connecting means further comprises limiting means limiting the extent of displacement of said second resilient means such that when said connecting means is initially subjected to applied stress, said second resilient means resiliently initially resists said applied stress and subsequently, upon increased applied stress, said limiting means provides a rigid connection under tension between said eccentric element and said support means.

6. A rotationally elastic coupling according to claim 5, wherein the resiliency of said second resilient means is such that said second resilient means is resiliently displaced a preset amount when said limiting means initially provides said rigid connection, said second resilient means being displaced to said preset amount before said limiting means provides said rigid connection to initiate displacement of the first said resilient means.

7. A rotationally elastic coupling according to claim 3, wherein said eccentric element comprises an eccentric disc on said one half coupling means.

8. A rotationally elastic coupling according to claim 3, wherein said connecting means comprises a rigid connecting rod.

9. A rotationally elastic coupling according to claim 3, wherein said connecting means comprises an elastic coupling.

10. A rotationally elastic coupling according to claim 9, wherein said elastic coupling comprises a resilient element and a limiting means such that when the elastic coupling is initially subjected to tension, the resilient element initially resists such tension and subsequently upon increased applied tension, said limiting means provides a rigid coupling under tension.

11. A rotationally elastic coupling according to claim 9, wherein said elastic coupling comprises a resilient element and pivotal links embedded within said resilient element, said pivotal links in the relaxed state of the resilient element being nonlinearly disposed such that when the elastic coupling is initially subjected to tension, the resilient element initially resiliently resists said tension until said pivotal links become generally linearly alinged so that said linearly aligned links thereby provide a rigid coupling under tension.

12. A rotationally elastic coupling according to claim 3, wherein said support means comprises a rigid plate element mounted on the outer radial side of said resilient means, said rigid plate element pivotably receiving said connecting means.

13. A rotationally elastic coupling according to claim 3, wherein said resilient means comprises elastomer material fixedly mounted on said other half coupling, said elastomer material having an outer radial side, said support means comprising a rigid member mounted on said outer radial side of said elastomer material.

14. A rotationally elastic coupling according to claim 13 further comprising pivotal means pivotably mounting said connecting means on said rigid member.

15. A rotationally elastic coupling according to claim 3 further comprising second resilient means resiliently connecting said connecting means to said support means.

16. A rotationally elastic coupling according to claim 1, wherein said eccentric means further comprises an eccentric disc element and a bearing disposed on said disc element.

17. A rotationally elastic coupling according to claim 16, wherein said bearing is disposed on the outer periphery of said disc element.

18. A rotationally elastic coupling according to claim 16, wherein said eccentric disc means further comprises a bearing-receiving part, said bearing-receiving part receiving said bearing and providing for relative movement between said bearing-receiving part and said eccentric disc element.

19. A rotationally elastic coupling according to claim 18, wherein said bearing-receiving part is pivotably mounted relative to said resilient means, said bearing-receiving part having a circular opening in which said bearing is received.

20. A rotationally elastic coupling according to claim 1, wherein said resilient means comprises an elastomer.

21. A rotationally elastic coupling comprising two rotatable half-coupling means rotatable about a common axis, an eccentric means mounted on one of said half coupling means and being eccentrically disposed relative to said common axis, said eccentric means being displaced along an orbital path of travel relative to said common axis upon rotation of said eccentric means, resilient means mounted on said other half coupling means, rigid support means disposed radially outwardly of said resilient means, and connecting means between said eccentric means and said support means such that said resilient means is compressed generally radially inwardly in resiliently resisting relative rotation between said two half coupling means, whereby said two rotatable half coupling means are thereby resiliently coupled.

22. A rotationally elastic coupling comprising two rotatable half coupling means rotatable about a common axis, an eccentric means on one of said half coupling means and being eccentrically disposed relative to said common axis, said eccentric means being displaced along a translatory path of travel upon rotation of said eccentric means, first resilient means mounted on said other half coupling means, rigid support means disposed on said first resilient means, and second resilient means resiliently connecting said eccenctric means to said support means such that said second-resilient means is initially stressed and said first resilient means is subsequently stressed in resiliently resisting relative rotation between said two half coupling means, whereby said two rotatable half coupling means are thereby resiliently coupled.

23. A rotationally elastic coupling according to claim 21, wherein said eccentric means comprises an eccentric disc on said one half coupling means.

24. A rotationally elastic coupling according to claim 22, wherein said second resilient means comprises a resilient element and a limiting means, said limiting means limiting the extent of displacement of said resilient element.

* * * * *